United States Patent
Koo

(10) Patent No.: US 9,824,283 B2
(45) Date of Patent: Nov. 21, 2017

(54) SYSTEM AND METHOD OF RECOGNIZING TRAVELLED LANE OF VEHICLE

(71) Applicant: HYUNDAI MOBIS CO., LTD., Seoul (KR)

(72) Inventor: Bon Wook Koo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 40 days.

(21) Appl. No.: 14/488,596

(22) Filed: Sep. 17, 2014

(65) Prior Publication Data
US 2016/0026876 A1    Jan. 28, 2016

(30) Foreign Application Priority Data
Jul. 28, 2014 (KR) .................. 10-2014-0095804

(51) Int. Cl.
*G06K 9/00* (2006.01)
*B60R 1/00* (2006.01)

(52) U.S. Cl.
CPC ............ *G06K 9/00798* (2013.01); *B60R 1/00* (2013.01); *B60R 2300/301* (2013.01); *B60R 2300/804* (2013.01); *B60R 2300/8086* (2013.01)

(58) Field of Classification Search
CPC ......... G06K 9/00798; B60T 2201/089; B60W 30/18163
See application file for complete search history.

(56) References Cited

U.S. PATENT DOCUMENTS 5,617,086 A * 4/1997 Klashinsky ............. G08G 1/08
                                                    340/436
6,097,313 A * 8/2000 Takahashi ............... G08G 1/09
                                                    340/905

(Continued)

FOREIGN PATENT DOCUMENTS

CN    101574970 A    11/2009
CN    102959599 A    3/2013
(Continued)

OTHER PUBLICATIONS

Korean Office Action issued on Apr. 25, 2017, in counterpart Korean Application No., 201410521128.2 (10 pages, in Korean).

*Primary Examiner* — Thomas Ingram
(74) *Attorney, Agent, or Firm* — NSIP Law

(57) ABSTRACT

Disclosed are a system and a method of recognizing a travelled lane of a vehicle, which recognize a currently travelled lane by using an image obtained through a camera of a vehicle or information received from a road system. Further, the system and the method detect whether the vehicle changes a lane by using sensing data of the vehicle, current location information, road map data, and the like, and when it is confirmed that the vehicle changes a lane or enters a new lane, the system and the method make the vehicle immediately recognize a currently travelled lane by combining information about the change of a lane or the new lane with information about the first recognized travelled lane. Accordingly, the present invention may make a vehicle recognize a travelled lane even when it is difficult to recognize a lane by a camera, and rapidly obtain information about the change of a lane and an entry lane, thereby determining a final lane. Further, the present invention provides a corresponding vehicle and surrounding vehicles with information about the final lane, so that the information (Continued)

may be utilized in an advanced driver assistance system (ADAS) or a V2V application service.

18 Claims, 6 Drawing Sheets

(56) References Cited

U.S. PATENT DOCUMENTS

| | | | | |
|---|---|---|---|---|
| 6,310,546 | B1* | 10/2001 | Seta | G06T 7/0075 340/507 |
| 6,556,916 | B2* | 4/2003 | Waite | G08G 1/042 340/933 |
| 2002/0198643 | A1* | 12/2002 | Lee | B62D 15/029 701/41 |
| 2005/0270374 | A1* | 12/2005 | Nishida | G05D 1/0246 348/148 |
| 2007/0225913 | A1* | 9/2007 | Ikeda | G06K 9/00798 382/104 |
| 2008/0027627 | A1* | 1/2008 | Ikeda | G06K 9/00798 701/117 |
| 2010/0253598 | A1* | 10/2010 | Szczerba | G01S 13/723 345/7 |
| 2010/0324775 | A1* | 12/2010 | Kermani | B60K 31/0058 701/31.4 |
| 2011/0052080 | A1* | 3/2011 | Tamura | G06K 9/00798 382/201 |
| 2011/0102579 | A1* | 5/2011 | Sung | G06K 9/00798 348/135 |
| 2012/0221168 | A1* | 8/2012 | Zeng | G08G 1/09626 701/1 |
| 2012/0307065 | A1 | 12/2012 | Mimeault et al. | |
| 2013/0101174 | A1* | 4/2013 | Meis | G08G 1/096716 382/104 |
| 2014/0002652 | A1* | 1/2014 | Gonzales | G07B 15/06 348/148 |
| 2014/0146176 | A1* | 5/2014 | Hayakawa | G08G 1/166 348/148 |
| 2014/0229106 | A1* | 8/2014 | Ishikawa | G01C 21/3647 701/533 |
| 2014/0257686 | A1* | 9/2014 | Feldman | G06F 17/00 701/300 |
| 2015/0278614 | A1* | 10/2015 | Lee | G06K 9/00798 348/148 |

FOREIGN PATENT DOCUMENTS

| | | |
|---|---|---|
| CN | 103718214 A | 4/2014 |
| JP | 2007-192582 A | 8/2007 |
| JP | 2010-231561 A | 10/2010 |
| KR | 10-0179076 B1 | 5/1999 |
| KR | 10-2011-0051531 A | 5/2011 |
| KR | 10-2012-0101844 A | 9/2012 |
| KR | 10-2013-0003521 A | 1/2013 |
| KR | 10/1217594 B1 | 1/2013 |
| KR | 10-2013-0021999 A | 3/2013 |
| KR | 10-2013-0122176 A | 11/2013 |

* cited by examiner

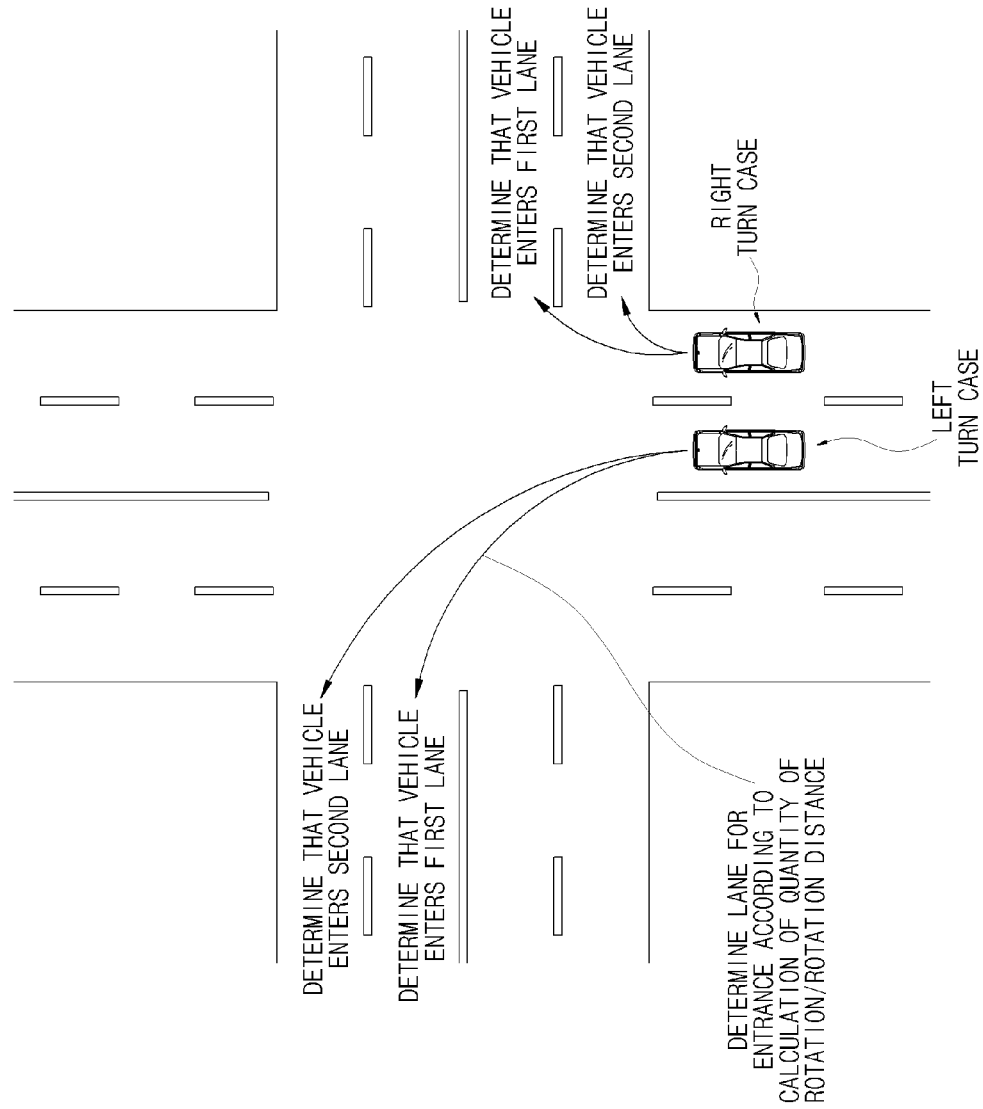

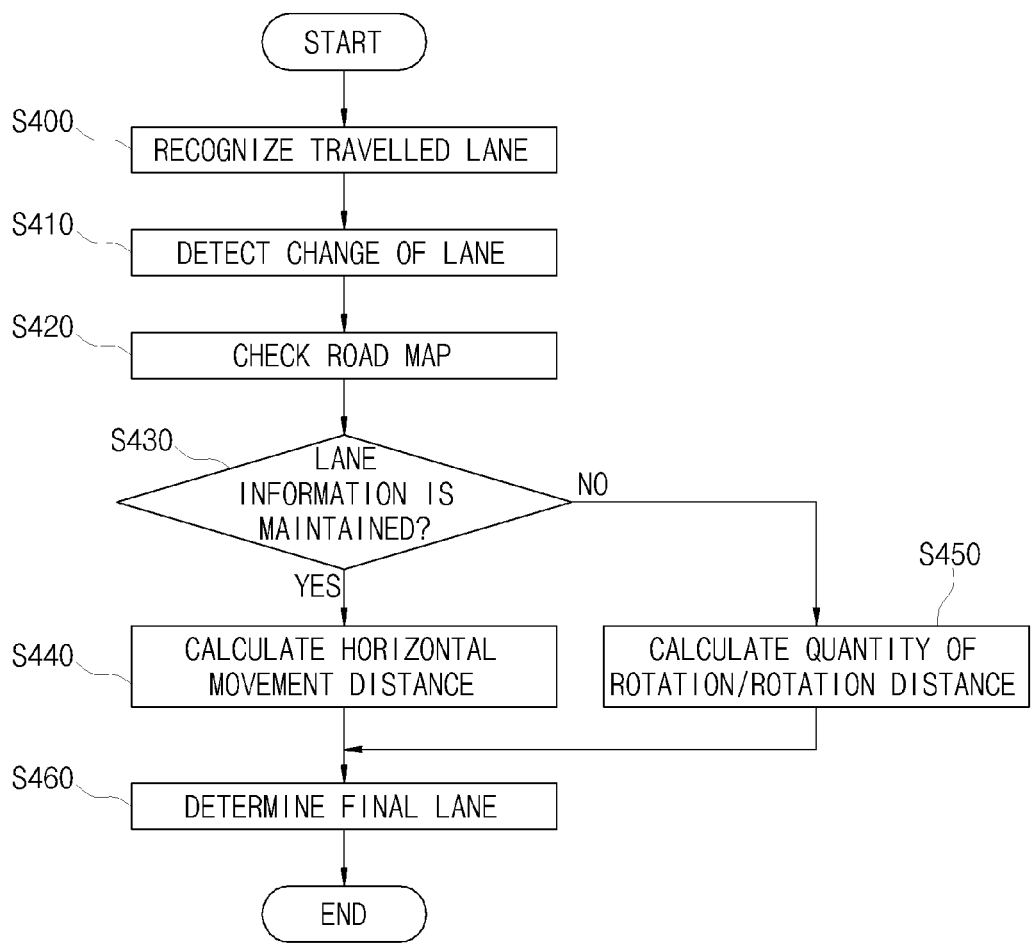

SYSTEM AND METHOD OF RECOGNIZING TRAVELLED LANE OF VEHICLE

CROSS-REFERENCE TO RELATED APPLICATIONS

This application claims priority under 35 U.S.C. §119 to Korean Patent Application No. 10-2014-0095804, filed on Jul. 28, 2014, in the Korean Intellectual Property Office, the disclosure of which is incorporated herein by reference in its entirety.

TECHNICAL FIELD

The present invention relates to a system and a method of recognizing a travelled lane of a vehicle, and more particularly, to a system and a method of obtaining information about a currently travelled lane of a vehicle currently travelling on a road.

BACKGROUND

A system for recognizing a travelled lane of a vehicle obtains information on a currently travelled lane of a vehicle, and accurate obtainment of information on a currently travelled lane becomes more important according to introduction of an advanced driver assistance system (ADAS), and the like which supports driving of a driver.

The system for recognizing the travelled lane in the related art generally recognizes a currently travelled lane of a vehicle by using a camera mounted in the vehicle, and provides a driver with information about the currently travelled lane. According to a device for recognizing a currently travelled lane of a vehicle (Korean Patent Application Laid-Open No. 10-2013-0122176) in the related art, a current lane is determined by using an image obtained through a camera, a global positioning system (GPS), and electronic map information.

For example, a current lane is determined by detecting a yellow line at a left side of a vehicle and recognizing the number of viewed lanes in an image obtained through a camera mounted on the left side of the vehicle, or a current lane is recognized by confirming the total number of lanes of a current road by using the GPS and electronic map information. Further, after the lane is recognized, it is confirmed whether the vehicle deviates to a left or a right through a camera installed on a front side of the vehicle, and a travelled lane is changed according to the confirmation.

However, the system for recognizing a travelled lane in the related art basically recognizes a lane by using an image obtained through a camera installed in a vehicle and recognizes a travelled lane, so that there is a problem in that it is difficult or impossible to recognize a lane when a line is hidden by a surrounding vehicle and is not viewed or in a section in which a line itself is not clear.

A start point of an entry lane may be confirmed at a junction/intersection of a road, but when a vehicle enters another lane, not a travelled lane while turning right or left (for example, the vehicle enters the second lane or the third lane while turning left in the first lane), there is a problem in that it is difficult to promptly recognize a lane.

SUMMARY

The present invention has been made in an effort to provide a system and a method of recognizing a currently travelled lane of a vehicle by using an image obtained through a camera installed in the vehicle, and information received from a camera installed around a currently travelled road of the vehicle or a road system.

An exemplary embodiment of the present invention provides a system for recognizing a travelled lane of a vehicle, including: a lane recognition unit configured to recognize a currently travelled lane of the vehicle by using lane information received from a road system or an image obtained through a camera attached to the vehicle; a lane change detection unit configured to detect a change of a lane of the vehicle and generate a result of the detection; and a final lane determination unit configured to combine the recognized lane and the generated result of the detection, and determine a currently travelled final lane of the vehicle.

The lane recognition unit may receive the lane information from a lane information transmission module which is located on a road and is capable of performing communication only within a region of the same lane, or a road system for analyzing a lane, on which the vehicle is located, by using an image of the vehicle photographed by a camera installed at a road side.

The lane change detection unit may detect a change of a lane of the vehicle by using data obtained from a sensor related to steering or a direction and attached to the vehicle and road map data, and the lane change detection unit may calculate a horizontal movement distance of the vehicle by using data obtained from the sensor related to steering or a direction and attached to the vehicle when the vehicle travels a straight road, and detect a change of a road of the vehicle, and detect a change of a lane of the vehicle by using a curvature of a currently travelled road of the vehicle and a horizontal movement distance of the vehicle when the vehicle travels a curved road.

The lane change detection unit may check information about a lane which the vehicle enters, by using current lane information of the vehicle and the quantity of rotation of the vehicle when the vehicle enters a road having different lane information.

The final lane determination unit may transmit information about the currently travelled final lane of the vehicle to a surrounding vehicle through a communication module, and may provide information about the currently travelled final lane of the vehicle through a display within the vehicle or transmit information about the currently travelled final lane of the vehicle to a driving support system of the vehicle.

Another exemplary embodiment of the present invention provides a method of recognizing a travelled lane of a vehicle, including: recognizing a lane of the vehicle from lane information received from a road system or an image obtained through a camera attached to the vehicle; detecting a change of a lane of the vehicle; determining a final lane of the vehicle based on the recognized lane and the detected change of a lane; and transmitting information about the final lane of the vehicle to a vehicle located around the vehicle.

According to the exemplary embodiment of the present invention, it is possible to recognize a currently travelled lane by using information received through a communication module, as well as an image obtained through a camera, thereby continuously maintaining information about the currently travelled lane of the vehicle even when a line is not viewed or is not recognized.

BRIEF DESCRIPTION OF THE DRAWINGS

FIGS. 2A, 2B, 3A, and 3B are diagrams illustrating an example of recognizing a changed lane by the system for recognizing a travelled lane of the vehicle according to the exemplary embodiment of the present invention.

FIG. 4 is a flowchart illustrating a process of a method of recognizing a travelled lane of a vehicle according to an exemplary embodiment of the present invention.

DETAILED DESCRIPTION OF EMBODIMENTS

Various advantages and features of the present invention and methods accomplishing thereof will become apparent from the following description of exemplary embodiments with reference to the accompanying drawings. However, the present invention is not limited to the exemplary embodiments disclosed herein but will be implemented in various forms. The exemplary embodiments are provided by way of example only so that a person of ordinary skilled in the art can fully understand the disclosures of the present invention and the scope of the present invention. Therefore, the present invention will be defined only by the scope of the appended claims.

Meanwhile, terms used in the present invention are to explain exemplary embodiments rather than limiting the present invention. Unless particularly stated otherwise in the present specification, a singular form also includes a plural form. "Comprises" and/or "comprising" used herein does not exclude the existence or addition of one or more other components, steps, operations and/or elements in or to mentioned components, steps, operations, and/or devices. Hereinafter, an exemplary embodiment of the present invention will be described in detail with reference to the accompanying drawings.

Figure 1:
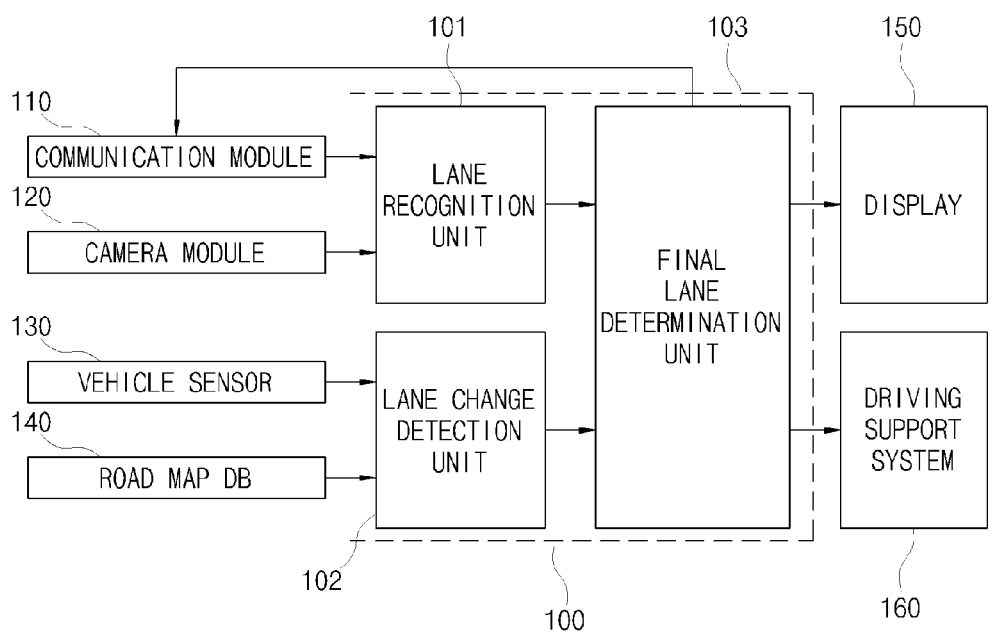
FIG. 1 is a block diagram illustrating a structure of a system for recognizing a travelled lane of a vehicle according to an exemplary embodiment of the present invention.

FIG. 1 is a block diagram illustrating a structure of a system for recognizing a travelled lane of a vehicle according to an exemplary embodiment of the present invention.

A system 100 for recognizing a travelled lane of a vehicle according to the exemplary embodiment of the present invention includes a lane recognition unit 101, a lane change detection unit 102, and a final lane determination unit 103.

The lane recognition unit 101 obtains information about a current travelled lane of the vehicle by using information received through a communication module 110 of the vehicle, and an image obtained through a camera module 120 mounted in the vehicle. That is, the lane recognition unit 101 recognizes the travelled lane by using the image obtained through the camera module 120 mounted in the vehicle, which is similar to the related art, and recognizes the travelled lane by using even the information received through the communication module 110, thereby recognizing the travelled lane even when a line is not recognized by the camera module 120.

Particularly, the communication module 110 receives information about the currently travelled lane from a lane information transmission module installed on a currently travelled road of the vehicle, or from a road system which analyzes a currently travelled lane of the vehicle by using an image of a camera installed at a roadside.

The lane information transmission module is installed on the road, and may be capable of performing communication only in a region within the same lane. Accordingly, the lane information transmission module broadcasts information about a lane at an installation location thereof to a communication available region, and the vehicle currently travelling on the corresponding lane receives the information about the lane broadcasted by the lane information transmission module to recognize the currently travelled lane.

In this case, the vehicle may simultaneously receive the information about the lane from the lane information transmission modules on both lanes while the vehicle changes a lane, so that it is possible to trust the corresponding information, and recognize the lane only when the number of elements of the information about the lane received from the lane information transmission module is one.

The road system obtains an image of a road and a vehicle through the camera installed around the road, analyzes the obtained image, and generates information about the currently travelled lane of the vehicle on the road. That is, when the camera installed around the road photographs the currently travelling vehicle, the road system receives the photographed image, analyzes the received image, and generates information about a lane on which a specific vehicle is currently travelled. Further, the road system transmits the generated information to the corresponding vehicle, and allows the corresponding vehicle to obtain information about a currently travelled lane.

Accordingly, the lane recognizing unit 101 of the system 100 for recognizing a travelled lane according to the exemplary embodiment of the present invention recognizes a lane even through the camera module 120, and receives the information about the currently travelled lane from the lane information transmission module installed on the road or the road system, so that it is possible to obtain the information about the currently travelled lane even when the camera module 120 of the vehicle is not normally operated or fails to recognize the lane.

The lane recognition unit 101 transmits the information about the travelled lane obtained through the communication module 110 or the camera module 120 to the final lane determination unit 103.

When it is detected that the vehicle changes the currently travelled lane, the lane change detection unit 102 generates information about the changed lane.

Particularly, the lane change detection unit 102 generates information about whether the vehicle changes a lane and about the change lane by using data obtained through a vehicle sensor 130 and map data stored in a road map DB 140. Accordingly, even though the vehicle changes a lane and the lane recognition unit 101 does not complete the recognition of the travelled lane, it is possible to immediately recognize the current lane through the information generated by the lane change detection unit 102.

The detection of the change of the travelled lane by the lane change detection unit 102 may be divided into the case where the vehicle travels a road having the same lane information (for example, there is no change in the number of lanes, and the vehicle travels a road in which a lane is continuously connected), and the case where the vehicle enters a road having different lane information (for example, the vehicle enters a junction/intersection of the road, or the vehicle passes through a crossroad to enter a new road).

Figure 2A:
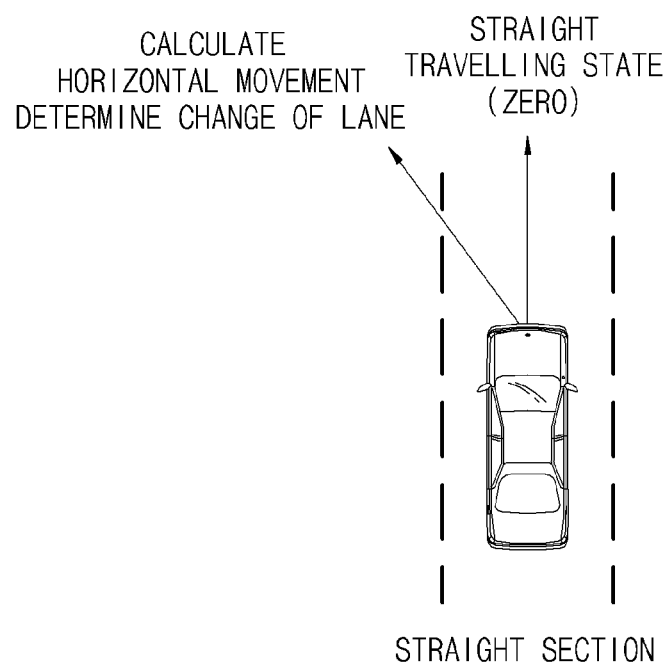
Figure 2B:
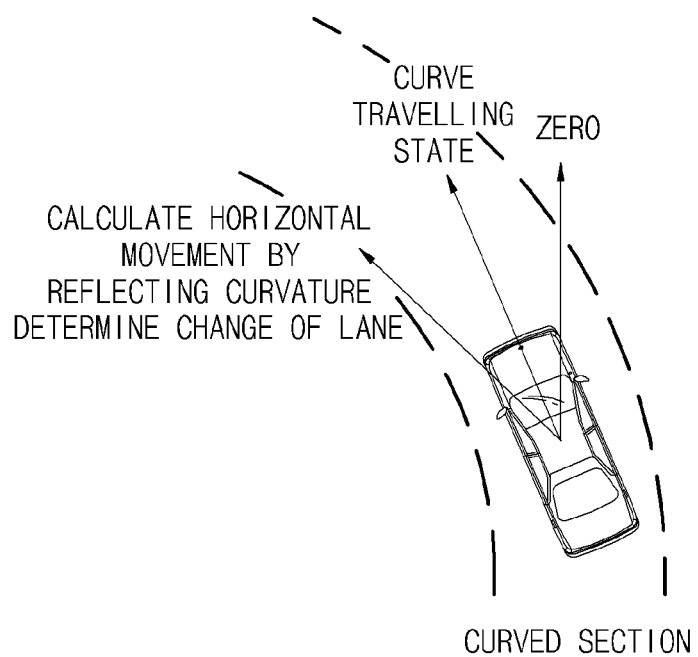
Figure 3A:
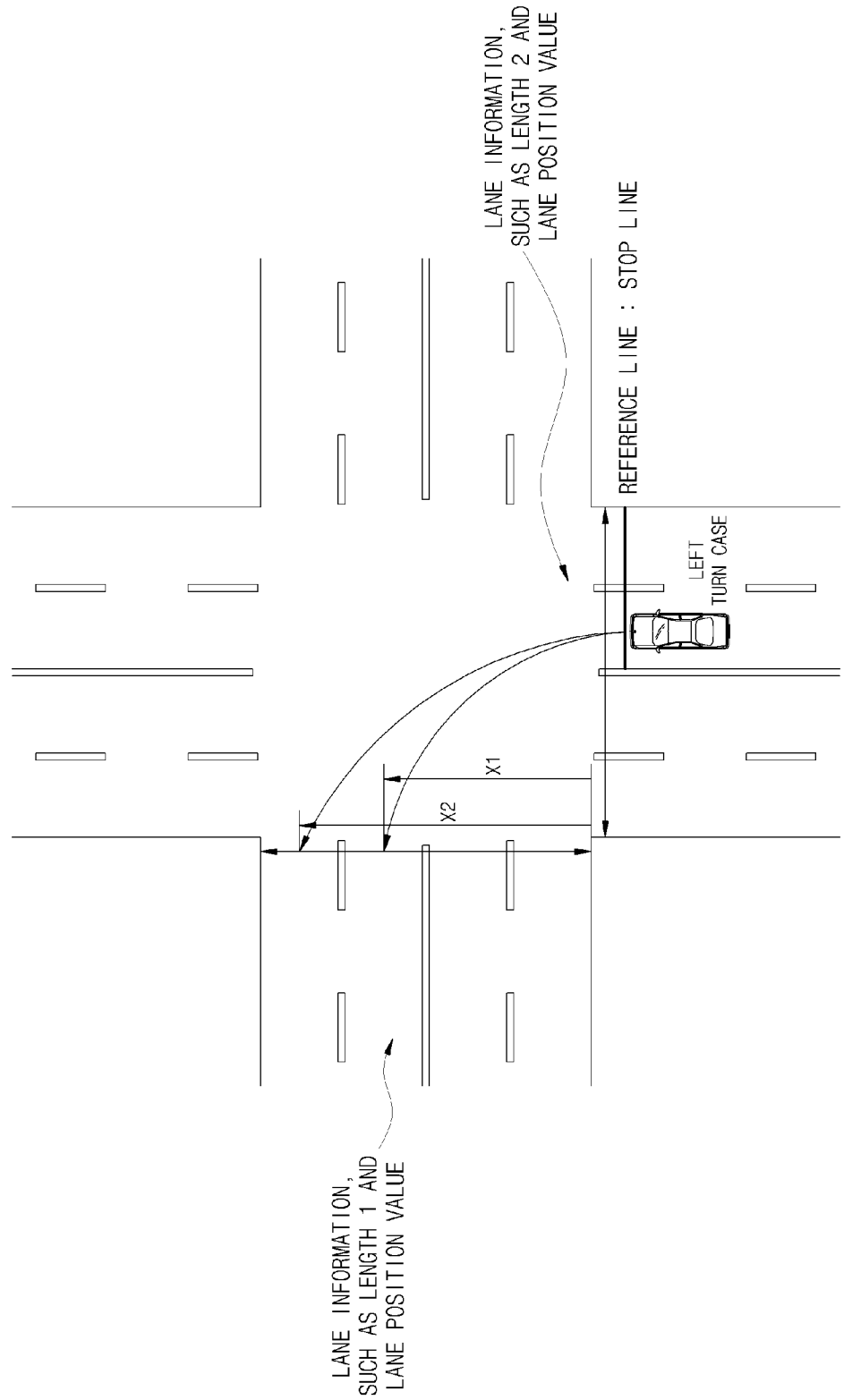

FIGS. 2A and 2B illustrate an example of the case where the vehicle travels the road having the same lane information, and FIGS. 3A and 3B illustrate an example of the case where the vehicle enters a road having different lane information.

FIG. 2A illustrates the case where a vehicle changes a lane while travelling a straight section of a road.

The lane change detection unit 102 checks a current location of the vehicle by using map data stored in the road map DB 140 and GPS information of the vehicle. Further, the lane change detection unit 102 calculates a horizontal movement distance of the vehicle by using information on steering and a direction (for example, information about a yaw rate and a steering angle) obtained through the vehicle sensor 130, and generates information about whether the vehicle changes a lane and about the changed lane.

FIG. 2B illustrates the case where a vehicle changes a lane while travelling a curved section of a road.

The lane change detection unit 102 checks a current location of the vehicle and a curvature of the currently travelled curved road by using the map data stored in the road map DB 140. Further, the lane change detection unit 102 detects whether the vehicle changes a lane, by relatively calculating a horizontal movement distance compared to the curvature of the curved road by using the information obtained through the vehicle sensor 130, and generates information about the changed lane.

The lane change detection unit 102 may also detect the change of a lane by using the information obtained through the camera module 120, as well as the information obtained through the vehicle sensor 130 and the road map DB 140.

FIGS. 3A and 3B illustrate an example of the detection of the change of a lane when the vehicle enters a road having different lane information, and illustrate an example in which the vehicle passes through a crossroad.

As illustrated in FIGS. 3A and 3B, when the vehicle passes through a crossroad, the vehicle does not travel a road formed by continuous lines, so that it is necessary to recognize a lane which the vehicle newly enters after passing through the crossroad. Further, even when the vehicle passes through a junction/intersection, information about a lane is mostly different, so that it is necessary to recognize a lane of a road which the vehicle newly enters.

Accordingly, the lane change detection unit 102 confirms the current location of the vehicle by using GPS information of the vehicle, and when it is recognized that the vehicle passes through the crossroad, the junction/intersection of the road, or the like, the lane change detection unit 102 checks information about the lane which the vehicle enters.

Particularly, the lane change detection unit 102 obtains information, such as a width of the total lanes, a width of each lane, and a lane location value, from the map data stored in the road map DB 140, and calculates the quantity of rotation and a rotation distance of the vehicle by using the data obtained from the vehicle sensor 130. Further, the lane change detection unit 102 determines an entrance point after the rotation compared to the road information in the map data, and generates the information about the lane which the vehicle enters.

For example, as illustrated in FIG. 3A, when it is confirmed that a movement distance according to the quantity of rotation or the rotation distance of the vehicle from a reference line, on which the vehicle is located, is X1, the lane change detection unit 102 determines that the vehicle enters the first lane, and when it is confirmed that the movement distance is X2, the lane change detection unit 102 determines that the vehicle enters the second lane.

Accordingly, when the vehicle enters a road having different lane information, the lane change detection unit 102 enables immediately recognizing the lane for entrance.

When the lane change detection unit 102 generates information about the changed lane or the information about the lane which the vehicle newly enters, the lane change detection unit 102 transmits the corresponding information to the final lane determination unit 103.

The final lane determination unit 103 combines the information about the travelled lane received from the lane recognition unit 101, the information about the changed lane and the information about the lane, which the vehicle enters, received from the lane change detection unit 102, and generates information about the currently travelled lane of the vehicle.

The final lane determination unit 103 transmits information about a final lane to a vehicle, which is currently travelling around the vehicle, through the communication module 110. Accordingly, the vehicles on the road may obtain information about the lane on which the surrounding vehicles are travelling, and utilize the obtained information for a driving assisting system or a V2V application service. For example, the obtained information may be used for confirming, by autonomous emergency braking (AEB), whether a vehicle currently travelling on the front same lane suddenly stops.

The final lane determination unit 103 may provide a driver with the information about the currently travelled lane through a display 150 within the vehicle, or transmit the information about the currently travelled lane to a driving support system 160 of the corresponding vehicle.

FIG. 4 is a flowchart illustrating a process of a method of recognizing a travelled lane of a vehicle according to an exemplary embodiment of the present invention.

The system for recognizing a travelled lane according to the exemplary embodiment of the present invention recognizes a currently travelled lane of the vehicle by using information received through the communication module of the vehicle or an image obtained through the camera module of the vehicle (S400). Further, the travelled lane recognition system detects whether there is a movement for changing a lane by the vehicle by using data obtained through the vehicle sensor (S410).

When it is detected that the vehicle changes a lane, the travelled lane recognition system checks a road map stored in the road map DB and a current location of the vehicle (S420), and checks whether the vehicle changes a lane on a road having the same lane information or enters a road having different lane information (S430).

That is, when the vehicle changes a lane on a road having the same lane information, the number of lanes and the information about the total lanes itself are the same, so that the changed lane is recognized by calculating a horizontal movement distance of the vehicle (S440). Further, when the vehicle enters a road having different lane information, for example, when the vehicle passes through enters a junction/intersection or a crossroad of the road, travelled lane recognition system may recognize a lane, which the vehicle enters, by using the current location of the vehicle, and the quantity of rotation and a rotation distance of the vehicle (S450).

The travelled lane recognition system combines the lane first recognized through the communication module or the camera module, the changed lane, the information about the lane which the vehicle newly enters, and recognizes the currently travelled lane of the vehicle (S460). The information about the recognized final lane may be provided through the display within the vehicle or utilized in the driving support system, and may be provided to surrounding vehicles to be utilized by the driving support systems of the surrounding vehicles.

It will be appreciated that various exemplary embodiments of the present invention have been described herein for purposes of illustration, and that various modifications, changes, substitutions may be made by those skilled in the art without departing from the scope and spirit of the present invention. Accordingly, the exemplary embodiments disclosed herein do not intent to limit, but to describe the technical spirit, and the scope of the present invention is not limited by the exemplary embodiment. The scope of the present invention should be interpreted by the appended claims, and it should be interpreted that all of the technical spirits in the equivalent range are included in the scope of the present invention.

What is claimed is:

1. A vehicle lane recognition system, comprising:
   a lane recognition unit of one or more processors of a vehicle configured to:
   recognize a lane in which the vehicle is located based on an image photographed by a camera attached to the vehicle, and
   recognize, when the lane recognition unit fails to recognize the lane based on the image photographed by the camera attached to the vehicle, the lane in which the vehicle is located using lane information that is received from a road system and is based on an image of the vehicle photographed by a camera installed at a road or a roadside;
   a lane change detection unit of the one or more processors configured to detect a lane change of the vehicle and generate a result of the detection; and
   a final lane determination unit of the one or more processors configured to combine the recognized lane and the generated result of the detection, and determine a new lane in which the vehicle is located.

2. The system of claim 1, wherein the road system comprises a lane information transmission module installed at the road or the roadside and configured to perform communication only within a region of the road.

3. The system of claim 1, wherein the lane recognition unit is configured to:
   receive the lane information from the road system; and
   analyze the lane in which the vehicle is located using the image of the vehicle photographed by the camera installed at the road or the roadside.

4. The system of claim 1, wherein:
   the lane change detection unit is configured to detect the lane change of the vehicle using data obtained from a sensor attached to the vehicle and road map data; and
   the sensor is configured to sense steering or a direction of the vehicle.

5. The system of claim 4, wherein the lane change detection unit is configured to:
   calculate a horizontal movement distance of the vehicle using data obtained from the sensor in response to the vehicle being on a straight portion of the road.

6. The system of claim 4, wherein the lane change detection unit is configured to detect the lane change of the vehicle using a curvature of the road and a horizontal movement distance of the vehicle in response to the vehicle being on a curved portion of the road.

7. The system of claim 1, wherein the lane change detection unit is configured to check information about the new lane using current lane information of the vehicle and a quantity of rotation of the vehicle in response to the vehicle entering a portion of the road having different lane information from that of a previous portion of the road.

8. The system of claim 1, wherein the lane change detection unit is configured to detect the lane change of the vehicle using an image obtained by a camera attached to the vehicle.

9. The system of claim 1, wherein the final lane determination unit is configured to transmit the information regarding the new lane to another vehicle through a communication module.

10. The system of claim 1, wherein the final lane determination unit is configured to:
    provide the information regarding the new lane to a display within the vehicle; or
    transmit the information regarding the new lane to a driving support system of the vehicle.

11. A method of recognizing a lane of a vehicle, comprising:
    recognizing a lane in which the vehicle is located based on an image photographed by a camera attached to the vehicle;
    recognizing, when the lane is not recognized based on the image photographed by the camera attached to the vehicle, using one or more processors, the lane in which the vehicle is located using lane information that is received at the vehicle from a road system and is based on an image of the vehicle photographed by a camera installed at a road or a roadside;
    detecting, using the one or more processors, a lane change of the vehicle; and
    determining, using the one or more processors, a new lane in which the vehicle is located based on the recognized lane and the detected lane change.

12. The method of claim 11, wherein the recognizing of the lane of the vehicle comprises:
    receiving the lane information from a lane information transmission module located at the road or the roadside and configured to perform communication only within a region of the road; and
    analyzing the lane in which the vehicle is located using the image of the vehicle photographed by the camera installed at the road or the roadside.

13. The method of claim 11, wherein:
    the detecting of the lane change of the vehicle comprises using data obtained from a sensor attached to the vehicle and road map data; and
    the sensor is configured to sense steering or a direction of the vehicle.

14. The method of claim 11, wherein the detecting of the lane change of the vehicle comprises checking information about the new lane using current lane information of the vehicle and a quantity of rotation of the vehicle in response to the vehicle entering a portion of the road having different lane information from that of a previous portion of the road.

15. The method of claim 11, further comprising:
    transmitting the information regarding the new lane to another vehicle.

16. The system of claim 1, wherein the lane recognition unit is further configured to recognize the lane in which the vehicle is located using an image obtained by a camera attached to the vehicle.

17. The method of claim 11, wherein the recognizing of the lane in which the vehicle is located further comprises using an image obtained by a camera attached to the vehicle.

18. A vehicle, comprising:
    a lane recognition unit configured to:
    recognize a lane in which the vehicle is located based on an image photographed by a camera attached to the vehicle, and
    recognize, when the lane is not recognized based on the image photographed by the camera attached to the vehicle, the lane in which the vehicle is located using lane information that is received from a road system and is based on an image of the vehicle photographed by a camera installed at a road or a roadside;

a lane change detection unit configured to detect a lane change of the vehicle and generate a result of the detection; and a final lane determination unit configured to combine the recognized lane and the generated result of the detection, and determine a new lane in which the vehicle is located.

* * * * *